United States Patent
Haas et al.

(10) Patent No.: US 9,970,473 B2
(45) Date of Patent: May 15, 2018

(54) FASTENING ELEMENT

(71) Applicant: Neumayer Tekfor Engineering GmbH, Hausach (DE)

(72) Inventors: Roman Haas, Hausach (DE); Freia Griesshaber, Schiltach (DE)

(73) Assignee: Neumayer Tekfor Engineering GmbH, Hausach (DE)

( * ) Notice: Subject to any disclaimer, the term of this patent is extended or adjusted under 35 U.S.C. 154(b) by 0 days. days.

(21) Appl. No.: 15/028,335

(22) PCT Filed: Aug. 22, 2014

(86) PCT No.: PCT/DE2014/000432
§ 371 (c)(1),
(2) Date: Apr. 8, 2016

(87) PCT Pub. No.: WO2015/051773
PCT Pub. Date: Apr. 16, 2015

(65) Prior Publication Data
US 2016/0252128 A1 Sep. 1, 2016

(30) Foreign Application Priority Data
Oct. 9, 2013 (DE) .................. 10 2013 016 714

(51) Int. Cl.
*F16B 43/00* (2006.01)
*F16B 41/00* (2006.01)
*F16B 39/38* (2006.01)

(52) U.S. Cl.
CPC ............ *F16B 41/002* (2013.01); *F16B 39/38* (2013.01); *F16B 43/00* (2013.01)

(58) Field of Classification Search
CPC .......... F16B 43/00; F16B 39/24; F16B 39/26; F16B 41/002
(Continued)

(56) References Cited

U.S. PATENT DOCUMENTS 1,598,165 A * 8/1926 Stevenson ............... F16B 39/24
411/313
1,607,274 A * 11/1926 Hecht ..................... F16B 39/36
301/35.623
(Continued)

FOREIGN PATENT DOCUMENTS

DE 88 13 513.6 U1 6/1989
DE 602 06 116 T2 7/2006
EP 1 577 571 B1 9/2006

OTHER PUBLICATIONS

International Search Report (PCT/ISA/210) issued in PCT Application No. PCT/DE2014/000432 dated Feb. 13, 2015, with English translation (four (4) pages).
(Continued)

*Primary Examiner* — Flemming Saether
(74) *Attorney, Agent, or Firm* — Crowell & Moring LLP

(57) ABSTRACT

A fastening element with a nut and a thrust washer is provided. The nut includes an interior portion with an internal thread and an abutment surface at one end. A snap edge radially encloses the abutment surface and has a nose edge projecting radially inward, with a chamber being formed between the abutment surface, the snap edge and the nose edge. The thrust washer has an interior recess, a flanged portion and a cylindrical portion, with an outside diameter of the flanged portion being greater than an outside diameter of the cylindrical portion. The flanged portion, the cylindrical portion, the snap edge and the nose edge are coordinated with one another, with the nose edge projecting into the interior of the nut such that the nose edge and the snap edge at least partially enclose the flanged portion of the thrust washer.

3 Claims, 6 Drawing Sheets

(58) Field of Classification Search
USPC ......... 411/533, 154–156, 531, 216, 217, 999
See application file for complete search history.

(56) References Cited

U.S. PATENT DOCUMENTS

| | | | |
|---|---|---|---|
| 1,611,210 A | 12/1926 | Liddell | |
| 1,796,610 A * | 3/1931 | Modler | F16C 23/06 |
| | | | 384/585 |
| 3,386,771 A * | 6/1968 | Verdier | B60B 3/16 |
| | | | 301/35.623 |
| 4,969,788 A | 11/1990 | Goiny | |
| 6,070,946 A | 6/2000 | Holmes | |
| 6,132,153 A | 10/2000 | LeVey et al. | |
| 6,676,345 B2 * | 1/2004 | Szczukowski | F16B 5/0241 |
| | | | 411/533 |
| 7,179,037 B2 * | 2/2007 | Aukzemas | F16B 5/0208 |
| | | | 411/107 |
| 7,192,234 B2 * | 3/2007 | Anderson | F16B 5/02 |
| | | | 411/338 |
| 7,699,570 B2 * | 4/2010 | Trotter | F16B 37/044 |
| | | | 411/533 |
| 8,388,288 B2 * | 3/2013 | Chiu | B29C 45/14336 |
| | | | 411/107 |
| 2002/0157509 A1 | 10/2002 | Turos | |
| 2002/0182032 A1 | 12/2002 | Anderson et al. | |
| 2003/0035699 A1 | 2/2003 | Harris | |
| 2004/0240962 A1 * | 12/2004 | Teng | F16B 41/002 |
| | | | 411/353 |
| 2013/0170895 A1 * | 7/2013 | Tseng | F16B 35/06 |
| | | | 403/270 |

OTHER PUBLICATIONS

German-language Written Opinion (PCT/ISA/237) issued in PCT Application No. PCT/DE2014/000432 dated Feb. 13, 2015 (six (6) pages).

German Search Report issued in counterpart German Application No. 10 2013 016 714.0 dated Mar. 31, 2014, with partial English translation (ten (10) pages).

* cited by examiner

FASTENING ELEMENT

CROSS REFERENCE TO RELATED APPLICATIONS

This application is a National Stage of PCT International Application No. PCT/DE2014/000432, filed Aug. 22, 2014, which claims priority under 35 U.S.C. § 119 from German Patent Application No. 10 2013 016 714.0, filed Oct. 9, 2013, the entire disclosures of which are herein expressly incorporated by reference.

BACKGROUND AND SUMMARY OF THE INVENTION

The invention relates to a fastening element, in particular to a fastening element, with at least one nut and with at least one thrust washer, wherein the nut has at least one interior space with an internal thread, an abutment surface, and a snap edge that encloses the abutment surface. The snap edge includes a radially inwardly projecting nose edge that preferably runs radially completely around the circumference of the nut as does a chamber formed between the abutment surface, the snap edge and the nose edge. The thrust washer has an interior recess.

Such fastening elements, which are composed of at least two parts, nut and thrust washer, are used in the prior art for axle central screw couplings on commercial vehicles, for example. Examples of alternative names for the thrust washer are pressure disc, spring collar, locking washer or, generally, plate.

A three-part fastening element in which a thrust ring is connected in a captive manner via a flanged and circumferential clamp to the nut is disclosed, for example, by German utility model patent document no. DE 88 13 513 U1. The thrust ring has a spherical calotte—(i.e., skullcap) shaped underside.

A two-part fastening means in which the thrust washer is held by the nut in a rotatable and captive manner via special retaining lugs is disclosed by European patent document no. EP 1 577 571 B1. However, the manufacture of the retaining lugs and bending them over into the cavity of the nut is costly.

In the function as the axle center nut in commercial vehicles, one-piece all-metal locknuts are particularly used to line up the wheel bearing and fasten the wheel hub. In this application, it is generally necessary to dispose a thrust washer between wheel bearing and locknut that is secured against rotation in the fastened state and ensures the self-retention function of the axle center nut during load-cycle changes.

When tightening the locknut on a bolt across from a mounting face—e.g., the wheel hub—torques and biasing forces must be applied which depend on the cooperation between the nut and the bolt as well as of the head seat of the mounting face. In the axle central screw couplings of the prior art, the head seat is formed by the disc, which is secured against rotation, particularly by positive mechanical engagement. As a result, a disc that is not present or is improperly positions can influence and distort the variables to be monitored during bolting. This, in turn, can lead to substantial safety risks.

It is therefore an object of the invention to provide a fastening element that enables maximally simple assembly, prevents the thrust washer from being forgotten, and ensures secure positioning of the thrust washer.

The fastening element according to the invention is first and substantially characterized in that the thrust washer has at least one flanged portion with an outside diameter and one cylindrical portion with an outside diameter, that the outside diameter of the flanged portion is greater than the outside diameter of the cylindrical portion, and that the flanged portion, the cylindrical portion, the snap edge and the nose edge are coordinated such with one another and the nose edge projects so far into the interior of the nut that the nose edge and the snap edge enclose the flanged portion at least partially.

The thrust washer of the fastening element according to the invention has at least two portions that differ from one another at least through their outside diameter. The flanged portion has a larger outside diameter than the cylindrical portion.

In one embodiment, the cylindrical portion has a cylindrical outer surface with a circular base area. The cylinder itself is a hollow cylinder due to the central opening for the bolt. In a supplementary or alternative embodiment, the flanged portion has a cylindrical outer surface with a circular base area.

In order to retain the thrust washer so as not to be lost, the flanged portion, the cylindrical portion, the snap edge, and the nose edge are coordinated such with one another and the nose edge projects so far into the interior of the nut that the nose edge and the snap edge enclose the flanged portion at least partially. As a result of the nose edge, which is inwardly aligned, the thrust washer is particularly secured against falling out of the chamber of the nut.

In one embodiment, the snap edge is an edge that completely encloses the abutment surface radially. In an alternative embodiment, the snap edge is not completely closed but rather has discontinuities, so that in this embodiment the abutment surface is also enclosed radially only in part by the snap edge.

In one embodiment, the nose edge is embodied particularly so as to run around circumferentially and thus form an annular edge or a circumferential edge on which the thrust washer rests. In one embodiment, the flanged portion rests particularly on the nose edge and the cylindrical portion is enclosed radially by the nose edge. There is preferably a radial clearance at least between the cylindrical portion and the nose edge.

One embodiment particularly involves a two-part fastening element which, as a result of the incorporation of the thrust washer during manufacture and the resulting captive fastening, is to be used as a complete component. This simplifies handling by the user of the fastening element.

In one embodiment, the flanged portion and the snap edge are coordinated with one another such that the snap edge encloses the flanged portion with a gap, preferably a radially circumferential gap. In one embodiment, a clearance which enables rotation between nut and thrust washer exists between the flanged portion, which is located within the chamber of the nut, and the snap edge. There is therefore a movable connection between nut and thrust washer which also enables consideration to be given to manufacturing tolerances.

As regards the geometry of the thrust washer, and therefore also indirectly with respect to the geometry of the nut, a provision is made in one embodiment that the flanged portion and/or the cylindrical portion and/or the thrust washer are embodied so as to be rotationally symmetrical about a longitudinal axis.

In one variant, the thrust washer is a part that consists of two hollow cylindrical portions, each with a circular base surface, the outside diameters of which differ from one another. The heights of the portions—that is, of the flanged and cylindrical portions—depends on the height of the snap edge and on the amount by which the thrust washer is to project over the nut.

The preceding embodiment is achieved, for example, with a design in which the thrust washer is embodied as a substantially massive component. In one embodiment, the thrust washer is produced as a turned part by stock removal at least in one production step and, in an alternative embodiment, it is produced using a suitable non-cutting shaping method.

In one embodiment, the two outer axial base areas of the thrust washer are each planar or flat. In one embodiment, at least the outer side of the flanged or of the cylindrical portion is planar and free of convexities. In one embodiment, at least one base area is not planar but rather has at least one convexity or recess.

The thrust washer is preferably held by the nose edge and is thus captively connected to the nut. The nut itself is particularly a massive component that is made of a metal, particularly steel.

In order to connect the thrust washer with the nut to the fastening element, one embodiment makes a provision that the nose edge and/or snap edge of the nut can be widened in a substantially elastic manner. For manufacturing, the thrust washer is therefore introduced into the chamber of the nut such that the latter widens substantially slightly elastically, thus permitting the introduction of the thrust washer. The material and particularly also the geometric dimensions of the nut particularly with respect to the snap edge and the nose edge must be selected accordingly.

As a result of the elastic widening, the snap edge and/or the nose edge returns to the original position or geometric shape after the introduction of the thrust washer and then captively secures the thrust washer.

To simplify the introduction of the thrust washer into the chamber of the nut, the two following embodiments are particularly provided and can be implemented together or each individually.

In one embodiment the nose edge tapers axially in the direction facing away from the abutment surface such that a radially circumferential chamfer is produced on the radially interior side of the nose edge. In this embodiment, the nose edge thus has such a taper on the side facing toward the thrust washer that the nose edge is narrower toward the outside—that is, in the direction facing away from the abutment surface of the nut—or, phrased the other way around, that the surface of the nose edge on which the thrust washer rests with its flanged portion projects radially farther into the interior of the nut than the axially outer end of the nose edge. This also results in targeted weakening of the material, which facilitates the elastic widening for the introduction of the thrust washer.

In an alternative embodiment at least one radially circumferential taper is provided on an end of the flanged portion of the thrust washer facing away from the cylindrical portion. In this embodiment, the flanged portion does not have a base area with a rectangular edge, for example, but rather a taper is provided that renders the radius of the base area of the flanged portion smaller in this direction than the outside diameter of the cylindrical flanged portion.

In another embodiment, particularly when the fastening element is used as an axle central screw coupling, micro-movements between the bolt and the fastening element and loosening from the bolt, which may occur as a result of load-cycle changes, are inhibited by the thrust washer being prevented from rotating in relation to the bolt by virtue of its shape, such as by the provision of at least one projection projecting into the interior recess of the thrust washer.

In one embodiment, the at least one projection projecting into the interior recess of the thrust washer is provided on an end of the cylindrical portion facing away from the flanged portion. In another embodiment, at least two projections projecting into the interior recess of the thrust washer are provided. The at least two projections are arranged in one embodiment so as to lie substantially diametrically opposite one another.

The projection or projections are intended to prevent rotation of the thrust washer in relation to the bolt in the tightened or fastened state. In one embodiment, the projections are or the projection is present substantially along the entire height of the interior recess of the thrust washer. In another variant, the thrust washer is spring-loaded.

Preferably, the spring-loaded thrust washer may be introduced into the chamber of the nut such that the thrust washer is biased when it is fastened on a bolt. The nut and the thrust washer must be appropriately designed and coordinated with one another.

The further introduction of the thrust washer into the chamber of the nut takes place in the spring-loaded thrust washer, upon fastening of the fastening element onto a bolt. During fastening, the thrust washer is pressed flat between nut and bearing surface, and a bias builds up that results from the fact that the spring-loaded thrust washer would like to return to its initial geometry.

A provision may be made in one embodiment that, in the state without bias—that is, in the relaxed initial position—the thrust washer spans an imaginary base area with a raised area. Since the thrust washer has a central recess (for the bolt), the imaginary base area results particularly from the fact that the empty interior is imaginarily connected to the surrounding areas of the thrust washer. The geometry and shape of the thrust washer thus brings about an arching of the thrust washer. This arching points out of the nut against the abutment surface of the nut (i.e., out of the nut) or in the direction of the abutment surface and thus quasi into the nut.

In one embodiment, only one raised area is provided. In another embodiment, the one raised area lies substantially on the longitudinal axis of the thrust washer. A raised convexity of the thrust washer preferably lies on the longitudinal axis of the thrust washer. If the thrust washer is embodied so as to be rotationally symmetrical, the raised area lies on the longitudinal axis around which the thrust washer is rotationally symmetrical. In this embodiment, if the fastening element is tightened around a bolt against a surface (e.g., a wheel hub), then when the thrust washer projects outwardly in the home position in the direction facing away from the abutment surface, the thrust washer is pressed axially in the direction of the abutment surface of the nut. As a result, the cylindrical portion is preferably guided in the direction of the snap edge. The bias is produced here through the "pressing-flat" of the thrust washer, which would like to return to the initial position with raised area.

Another embodiment makes a provision that at least one retaining element is present at a free end of the nut. The purpose of the retaining element is to secure the nut against rotation on a bolt thread on which the fastening element overall is to be fastened. The free end of the nut lies across from the end of the nut having the abutment surface. The retaining element is a retaining element that is based on friction in the thread, such as a clamping element or clamping segment, for example, whose threaded region is sloped at a predeterminable angle of inclination in the direction of the longitudinal axis of the nut and thus reaches into the interior of the nut. Such a retaining element is known, for example, from the applicant's ENKO nuts.

Other objects, advantages and novel features of the present invention will become apparent from the following detailed description of one or more preferred embodiments when considered in conjunction with the accompanying drawings.

DETAILED DESCRIPTION

Figure 1:
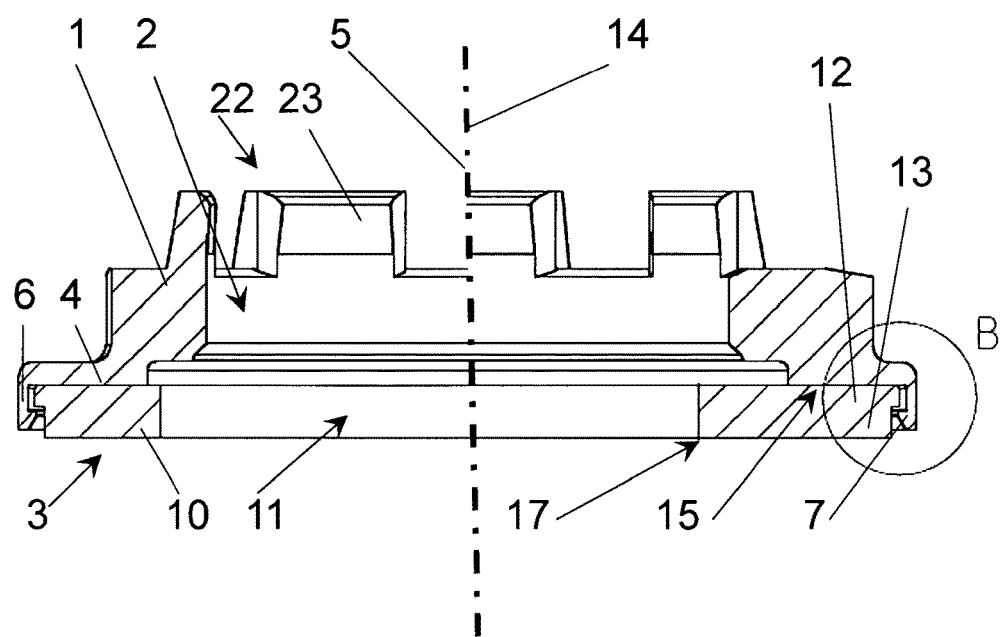
FIG. 1 shows a section through a fastening element according to a first embodiment of the present invention.
Figure 2:
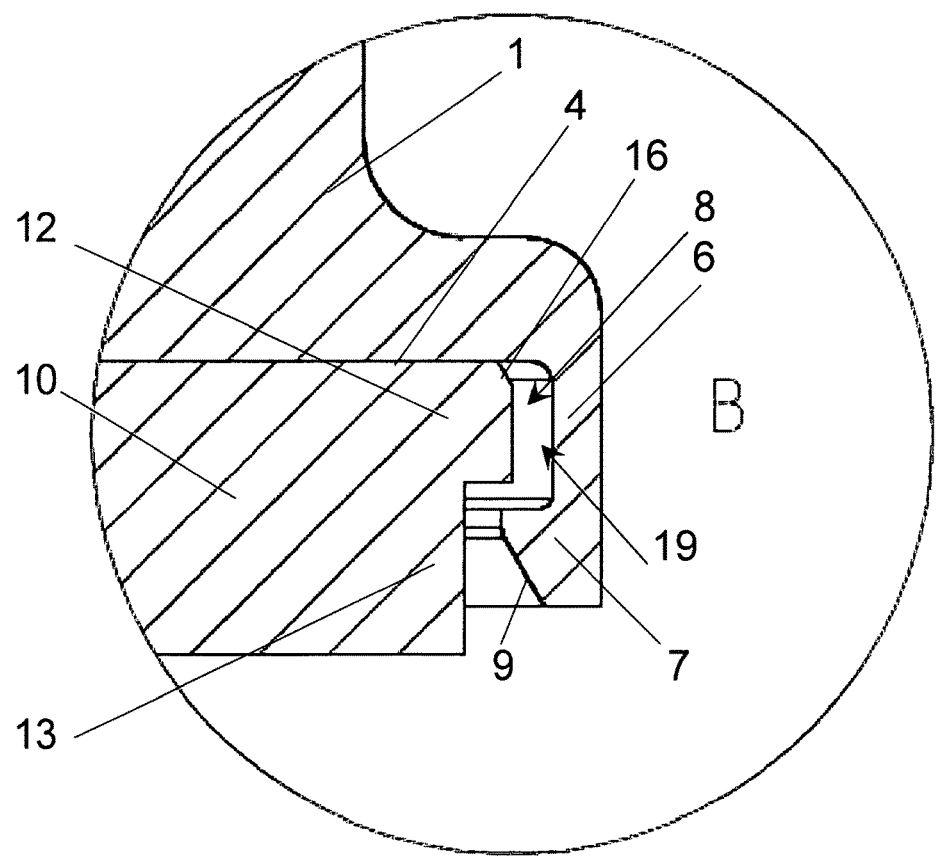
FIG. 2 shows an enlarged section of the fastening element of FIG. 1.

The section shown in FIG. 1 and the FIG. 2 enlarged view of the detail designated by B show the fastening element according to a first embodiment of the invention having a nut 1 and a thrust washer 10. The nut 1 holds the thrust washer 10 captively, so that only one object must be handled when used, for example during the fastening of a wheel hub. This connection also ensures that the thrust washer 10 is always positioned correctly relative to the nut 1.

The nut 1 has an interior 2 in which the internal thread for fastening on a bolt—not shown here—is located. An abutment surface 4 is provided at the end 3 of the nut 1 that, in the fastened state, is usually in contact with a surface of an object having the bolt and against which the thrust washer 10 is pressed in the fastened state. Here, the abutment surface 4 is within the interior 2, which is radially circumferential and also rotationally symmetrical to the longitudinal axis 5 of the nut 1.

Laterally, the abutment surface 4 is bordered by a snap edge 6 which, in the depicted embodiment, extents axially at a predetermined height parallel to the longitudinal axis 5. The snap edge 6, which is immediately adjacent to the abutment surface 4 here, is also the lateral protection of the thrust washer 10.

The snap edge 6, as an axially external region at this end 3 of the nut 1, leads to a nose edge 7, which projects as an edge into the interior 2 of the nut 1. The nose edge 7 is also embodied here so as to be rotationally symmetrical around the longitudinal axis 5. The snap edge 6 also transitions integrally into the nose edge 7.

Overall, a radially circumferential chamber 8 is formed by the abutment surface 4, the snap edge 6 and the nose edge 7 that is adjacent to the nut body and receives the thrust washer 10.

The nose edge 7 tapers in the direction counter to the abutment surface 4, thus resulting in a chamfer 9 on the side facing toward the interior 2.

This chamfer 9 is a targeted weakening of the material of the nose edge 7 in order to enable elastic behavior of the nose edge 7 and/or of the snap edge 6 for the introduction of the thrust washer 10 during the assembly of the fastening element. Such a chamfer also facilitates the insertion of the thrust washer 10 during assembly into the chamber 8 of the nut 1.

In the illustration of FIG. 1, the nut 1 and the thrust washer 10 are arranged in relation to one another such that the longitudinal axis 5 of the nut 1 coincide.

The thrust washer 10 is embodied here as a rotationally symmetrical, massive component having two substantially cylindrical portions, a flanged portion 12 and a cylindrical portion 13. The two portions 12, 13 are disposed here in a hollow cylindrical manner around the interior recess 11, through which the bolt—not shown here—is guided during the placement of the fastening element. The flanged portion 12 has a larger outside diameter than the cylindrical portion 13.

The two outside diameters of the cylindrical portions 12, 13 are predefined or matched with the dimensions of the nut 1 such that the flanged portion 12 just comes to rest on the nose edge 7, with the cylindrical portion 13 being enclosed radially by the nose edge 7. The height of the cylindrical portion 13 is determined in the depicted embodiment such that the thrust washer projects axially over the nut 1 or especially the nose edge 7.

The flanged portion 12 is located within the chamber 8 in such a way that a gap 19 exists between the outer edge of the flanged portion 12 and the inner edge of the snap edge 6. The gap 19 means that the thrust washer 10 is held by the nut 1 with a certain amount of backlash, thus enabling relative movement between washer 10 and nut 1.

The thrust washer 10 is planar on the end 15 facing away from the cylindrical portion 13 and on the opposing end 17, that is, the end 17 facing away from the flanged portion 12.

For the purpose of threading the thrust washer into the chamber 8 of the nut 1, a taper 16 is provided on the outer edge of the end 15 of the thrust washer 19 facing away from the cylindrical portion 12.

In this embodiment the nose edge 7 completely encloses the thrust washer 10 and thus also constitutes a protective edge against the bringing-in of fouling or moisture, for example. This seal also makes it possible to use the fastening element multiple times. This protection is furthered by the thrust washer 10 being introduced into the nut 1 without changing shape (as occurs, for example, during flanging) and being held and protected by the encompassing nose edge 7.

The nut 1 is further secured on the respective bolt by the retaining elements 23, which are located on the free end 22 of the nut 1. The free end 22 lies across from the end 3 that receives the thrust washer 10.

The retaining elements 23 are individual segments that are slanted in the direction of the longitudinal axis 5 of the nut 1 at a certain angle of inclination and thus pressed against the bolt (not shown here). The retaining elements 23 have at least parts or portions of an internal thread.

Figure 3:
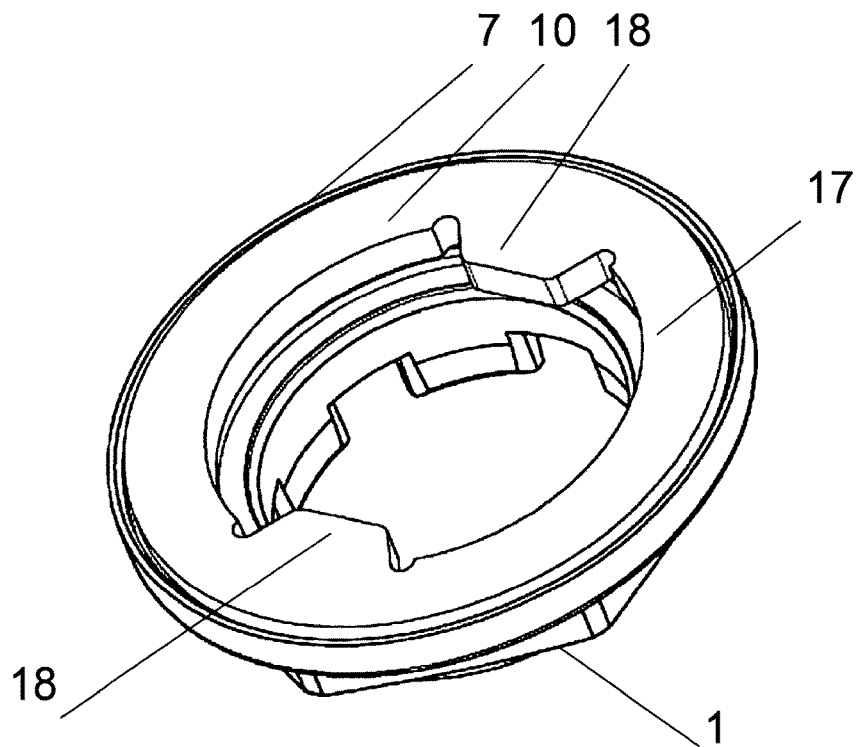
FIG. 3 shows a spatial representation of the fastening element of FIG. 1.

FIG. 3 shows a spatial representation of the underside of the fastening element of FIGS. 1 and 2. It can be seen here that two projections 18 are provided on the outward side of the planar thrust washer 10, that is, on the end 17 of the cylindrical portion 13 facing away from the flanged portion. The two projections 18 project radially into the interior of the thrust washer 10 and extend axially and continuously over the entire height of the interior of the thrust washer 10. These two projections 18 are diametrically opposed here and serve to prevent rotational movement after mounting on a bolt. As a result, the fastening element is prevented from rotating on a bolt (not shown here).

Figure 4:
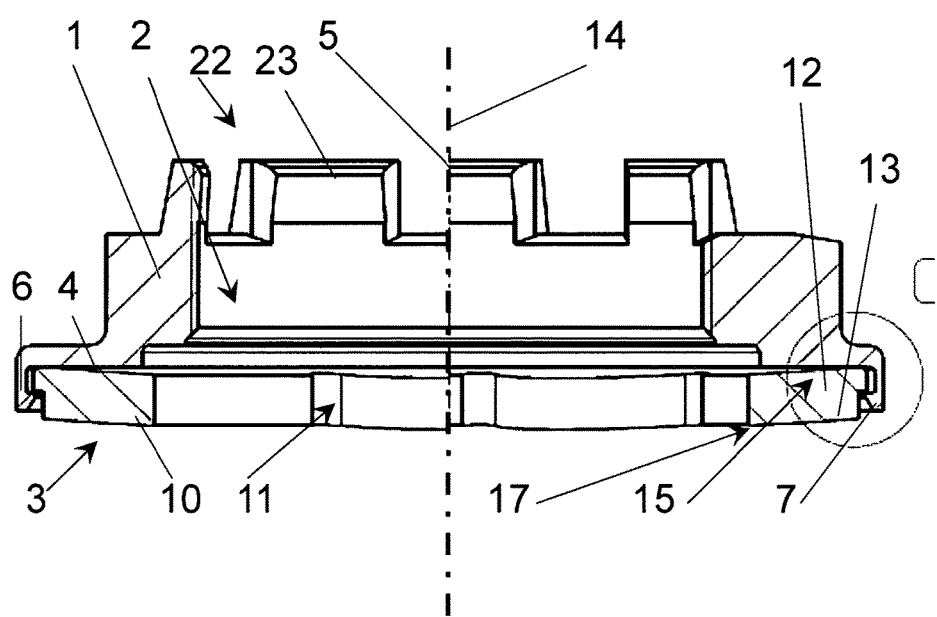
FIG. 4 shows a section through a fastening element according to a second embodiment of the present invention.
Figure 5:
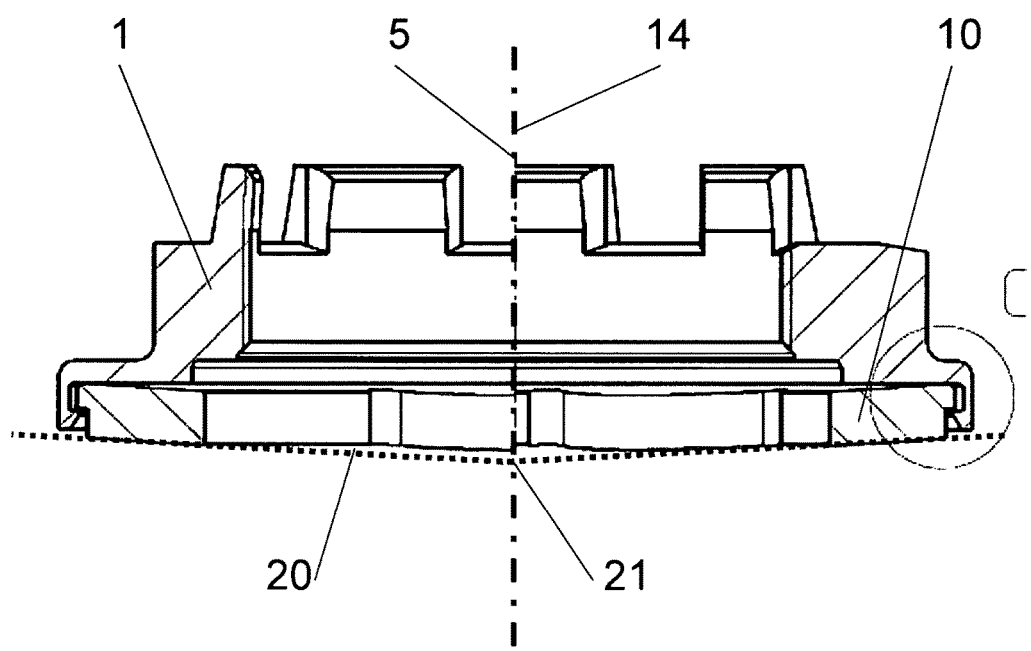
FIG. 5 shows the section of FIG. 4 with a drawn-in imaginary base area of the thrust washer.
Figure 6:
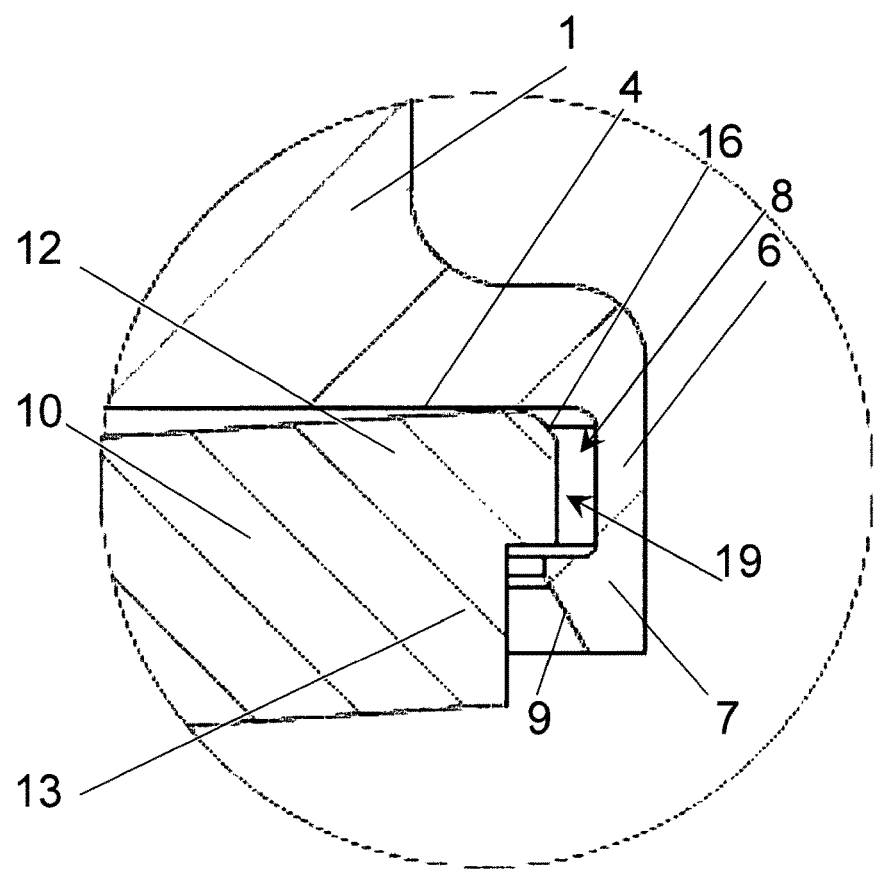
FIG. 6 shows an enlarged detailed view of the fastening element of FIG. 4.

FIGS. 4 and 5 as well as the portion designated with C and shown under enlargement in FIG. 6 show an alternative embodiment of the fastening element of nut 1 and thrust washer 10. The essential difference from the embodiment initially shown lies in the shape of the thrust washer 10.

The thrust washer 10 is spring-loaded in the FIGS. 4-6 embodiment, and the thrust washer 10 rests with bias against the abutment surface 4 of the nut 1 in the state in which it is fastened on a bolt (not shown here). As drawn in FIG. 5, in the non-fastened state (i.e., free basic state) the thrust washer 10 forms an imaginary base area 20 that is arched axially outward to a raised area 21. The raised area 21 lies on the longitudinal axis 14 of the thrust washer 10 and thus along the axis on which the bolt (not shown here) is introduced into the fastening element during fastening. However, the flanged portion 12 rests captively without bias within the chamber 8 of the nut 1 in the relaxed state as well.

If the bolt (not shown here) is passed through the fastening element and the nut tightened, the thrust washer 10 experiences a force that presses it radially outward into the chamber 8. This flattened geometry of the elastically resilient thrust washer 10 produces a bias in the thrust washer 10; as a result, the thrust washer 10 strives in the tightened state to return to the lower-energy geometry with the raised area 21 along the longitudinal axis 14.

The variant of the fastening element with a spring collar as a thrust washer 10 is provided particularly for the case of loss of biasing force. If the biasing force of the fastening element decreases, for example as a result of the aforementioned micromovements, a certain residual biasing force is still present as a result of the resilient thrust washer 10 that counteracts a free unscrewing of the nut 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fastening element, comprising:
   at least one nut having at least one interior portion with an internal thread; and
   at least one thrust washer having an interior recess, wherein
   the at least one nut includes at least one nut end having a radially circumferential abutment surface and a snap edge radially enclosing the abutment surface,
   the snap edge including a radially inwardly projecting nose edge,
   the abutment surface, the snap edge and the nose edge define a chamber therein,
   the at least one thrust washer includes a flanged portion having a flanged portion outside diameter and a cylindrical portion having a cylindrical portion outside diameter smaller than the flanged portion outside diameter,
   the flanged portion, the cylindrical portion, the snap edge and the nose edge are configured and the nose edge projects radially inward a distance sufficient such that a radially outer portion of the thrust washer flanged portion is located between the abutment surface and the nose edge and the nose edge axially encloses an axial portion of the thrust washer cylindrical portion when the at least one thrust washer is in an installed position in the at least one nut,
   the at least one nut is configured such that at least one of the nose edge and the snap edge is elastically expandable an amount sufficient to permit insertion of the at least one thrust washer into the at least one nut,
   the nose edge tapers axially from a side closest to the abutment surface having a first inner diameter to a side farthest from the abutment surface having a second inner diameter larger than the first inner diameter,
   at least one radially circumferential taper is provided on an end of the flanged portion of the thrust washer facing away from the cylindrical portion, and
   the at least one thrust washer is configured such that when in the installed position in the at least one nut the at least one thrust washer is biased against the nut in a manner such that the at least one thrust washer spans an imaginary raised base area transverse to the longitudinal axis of the at least one thrust washer.

2. The fastening element as set forth in claim 1, wherein the flanged portion and the snap edge are configured such that a radially circumferential gap is formed between the snap edge and the flanged portion.

3. The fastening element as set forth in claim 1, wherein at least one retaining element is present on a free end of the at least one nut opposite the nut end having the radially circumferential abutment surface.

* * * * *